United States Patent [19]

Rocco et al.

[11] Patent Number: 4,766,848
[45] Date of Patent: Aug. 30, 1988

[54] PORTABLE CONDITIONING AND EXERCISING DEVICE FOR ANIMALS

[76] Inventors: Lucille M. Rocco; Francine A. Wild, both of 819 Tyler Rd., NW., Albuquerque, N. Mex. 87107

[21] Appl. No.: 40,591
[22] Filed: Apr. 17, 1987
[51] Int. Cl.[4] ............................................ A01K 15/00
[52] U.S. Cl. ...................................... 119/29; 119/117
[58] Field of Search ................ 119/29, 117; 272/28 R, 272/28 S, 29

[56] References Cited

U.S. PATENT DOCUMENTS

| | | | |
|---|---|---|---|
| 1,181,881 | 5/1916 | Hausz | 119/117 |
| 1,956,937 | 5/1934 | Van Kleek | 119/117 X |
| 2,831,457 | 4/1958 | McMurry | 119/29 |
| 2,981,230 | 4/1961 | Putnam | 119/117 |
| 3,424,132 | 1/1969 | Fischer et al. | 119/29 |
| 3,665,892 | 5/1972 | Kusisto | 119/29 |
| 3,716,029 | 2/1973 | Pillsbury, Jr. | 119/29 |
| 3,773,018 | 11/1973 | Profughi | 119/29 |
| 3,815,551 | 6/1974 | Losaw | 119/29 |
| 3,981,274 | 9/1976 | Curtis | 119/29 |
| 4,275,686 | 6/1981 | MacGillivray | 119/29 |

Primary Examiner—Robert Peshock
Attorney, Agent, or Firm—Deborah A. Peacock; Robert W. Weig

[57] ABSTRACT

An improved, portable conditioning, exercising and walking device for animals. The device includes two separable units; a lower driver unit and an upper arm unit. The lower drive unit causes the upper arm unit to rotate so that the animal(s) walk or run in a circular path. Arms on the upper arm unit fold downward and inward to adjust to smaller animals and to enhance the portability of the device.

21 Claims, 3 Drawing Sheets

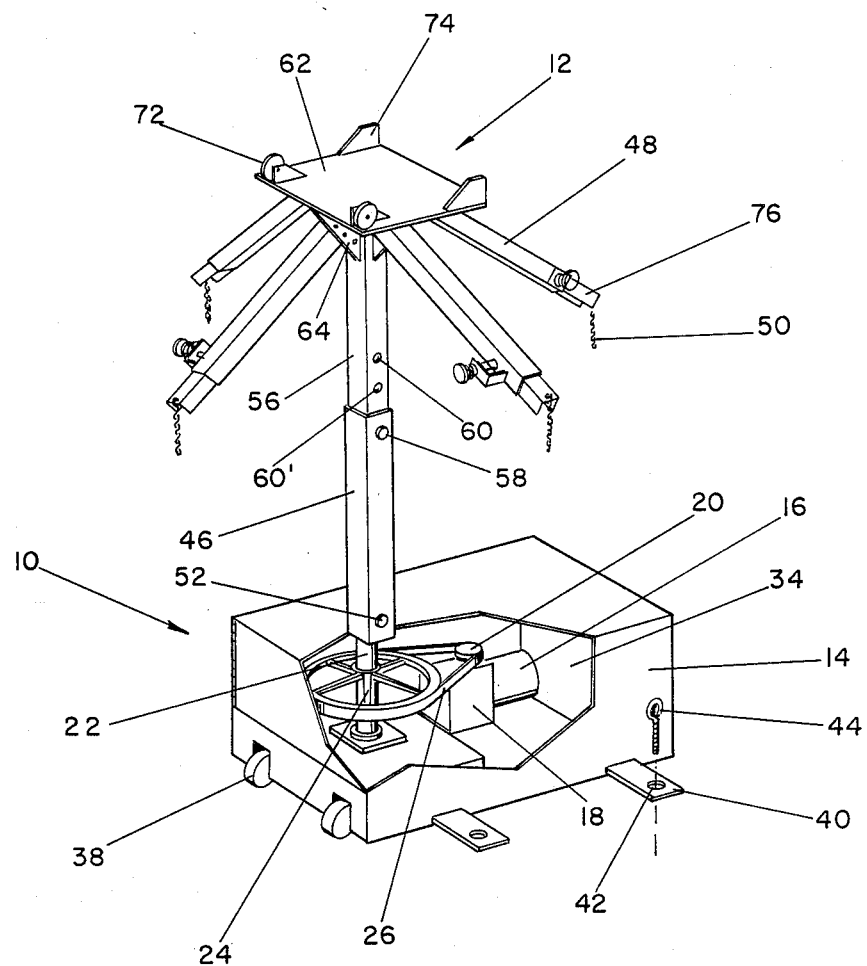
FIG—2

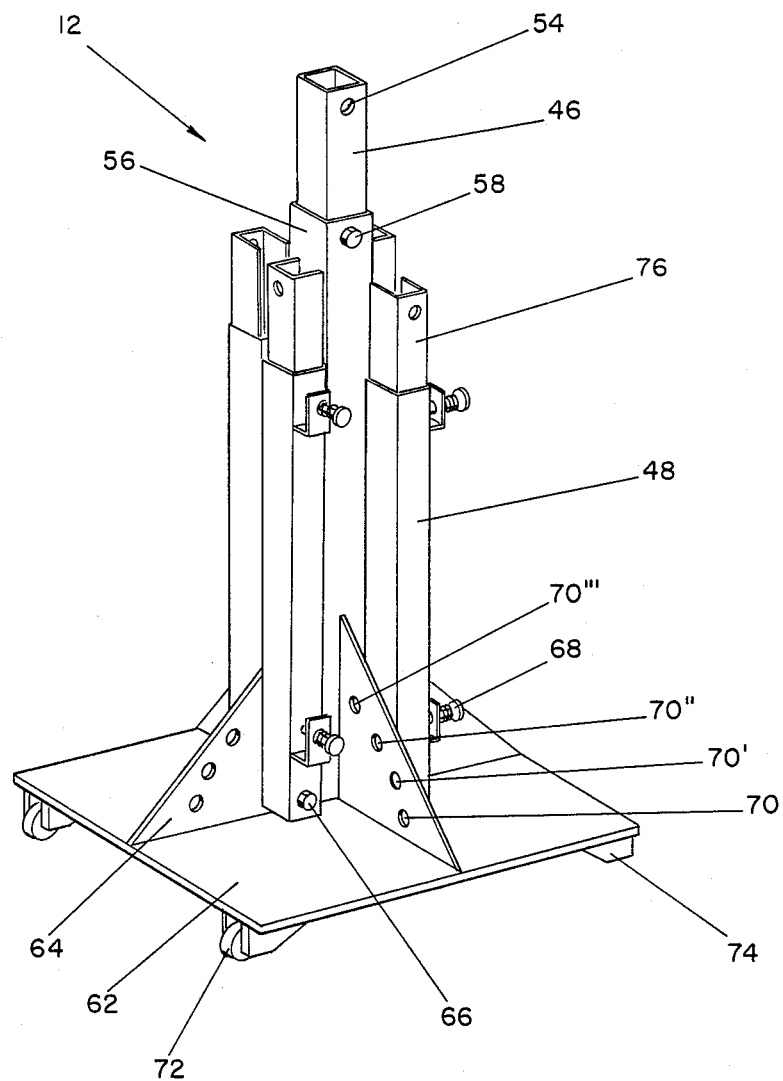
FIG—3

PORTABLE CONDITIONING AND EXERCISING DEVICE FOR ANIMALS

BACKGROUND OF THE INVENTION

1. Field of the Invention

This invention relates to an adjustable and portable device for conditioning, exercising and walking animals, in particular dogs and cats.

2. Description of the Prior Art

Overweight and out-of-condition animals experience many similar health problems to those of humans. The American Animal Hospital Association estimates that obesity affects 40% of all dogs in the United States due to too much food and too little exercise. Congestion, lack of space and various city ordinances leave city residents at a loss to provide adequate exercise for their animals without reoccurring expense of hired human walkers. Moreover, the ability of the elderly and handicapped to provide their pets with proper exercise is severely limited.

Pure-bred dog shows, a billion dollar business, is sorely in need of an alternative method to keep contending animals in peak condition for competition. A professional dog handler transports an average of 8 to 15 dogs to between 125 and 150 dog shows per year. The dogs spend an overwhelming amount of that time in the confines of crates not unlike those which airlines use in transport. After an exhausting 12 to 15 hour day of grooming and showing the dogs, these handlers have little time or energy to maintain sufficient, consistent methods of exercising and conditioning the dogs.

There are several devices in the prior art which are used to walk or exercise animals. U.S. Pat. No. 3,716,029, entitled ANIMAL EXERCISING DEVICE, to Pillsbury, discloses a portable, power operated device which can exercise several animals at a time. This device has extendable arms for adjusting the arm length outward and an extendable vertical post to move the arms upward or downward relative to the ground. When the device is to be moved, the arms can be rotated upward and then must be hooked into place to hold them in this upward position. Because the arms fold upward, this device does not fit into short spaces and so the portability, is limited. Moreover, the base cannot be easily moved.

U.S. Pat. No. 3,665,892, entitled EXERCISER FOR ANIMALS, to Kusisto, discloses an animal exercising device which has "simulated bait" on one arm to induce an animal hooked to the other arm to move in a rotational path. U.S. Pat. No. 2,831,457, entitled ANIMAL EXERCISING DEVICE, to McMurry, discloses an animal exercising device which has an animal retarding shield to keep the animal moving in the rotational path. Neither of these devices provide for adjustable or foldable arms, or easily portable bases.

There are several horse walking devices in the prior art, but these devices have limited adjustability and portability. U.S. Pat. No. 4,275,686, entitled HORSE EXERCISER DRIVE MECHANISM, to MacGillivray, discloses an adjustable speed device for walking or trotting horses. U.S. Pat. No. 3,981,274, entitled HORSE WALKER HAVING A CONTINUOUSLY VARIABLE TRANSMISSION AND FOLDING BOOMS, to Curtis, discloses a horse walking device having a variable speed transmission and booms or arms which can be folded upward with the aid of a hydraulic jack. U.S. Pat. No. 3,815,551, entitled HORSE WALKER, to Losaw, discloses a horse walking device having booms which nest together on one side for moving or storing the device. U.S. Pat. No. 3,773,018, entitled HORSE WALKER, to Profughi, discloses a motorized rotational horse walking device having a slip clutch. U.S. Pat. No. 3,424,132, entitled HORSE WALKER, to Fischer et al., also discloses the use of a slip clutch for a rotational horse walker.

SUMMARY OF THE INVENTION

To overcome the problems of the prior art, a portable device has been developed for conditioning, exercising, and walking animals. The device is adjustable, lightweight and portable.

The device of the invention comprises a lower drive unit and an upper arm unit which can be attached to or detached from each other. The lower drive unit comprises a rotatable drive shaft and power driving means for rotating the drive shaft. The upper arm unit comprises a central post having a drive shaft attachment end which attaches to the drive shaft and a top end which is distant from the drive shaft attachment end; central post attachment means for attaching and detaching the central post from the drive shaft; at least one arm having a proximal end which is positioned generally at the top end of the central post and a distal end which is positioned distant from the top end of the central post; and animal attachment means positioned at the distal end of each arm for attaching an animal to each arm.

The arms are movable relative to the central post and can be held in at least two positions; an extended position wherein the longitudinal axis of the arm is generally perpendicular to the longitudinal axis of the central post, and a collapsed position wherein the longitudinal axis of the arm is generally parallel and next to the central post. Preferably, the arm can also be held in at least one intermediate position between the extended position and the collapsed position.

The preferred embodiment of the device of the invention comprises four arms which are evenly spaced around the central post. With four arms, the device can accommodate four animals.

The device of the invention preferably further comprises a housing to enclose the power driving means. Preferably, the lower drive unit further comprises stabilizing means, such as extended legs or suction cups on the base of the housing, to prevent the device from moving or falling over during operation. The lower drive unit also preferably comprises wheels for portability purposes. These wheels are useful for moving just the lower drive unit, or for moving the entire device when the lower drive unit and upper arm unit are attached. Preferably, the wheels are recessed into the housing so that the base of the housing can sit flat on the ground or the operating surface. The lower drive unit also preferably further comprises a handle which is attached to the housing to enhance the portability.

The preferred power driving means includes an electrical motor, a motor pulley, a drive shaft pulley which attaches to the drive shaft, a drive belt which wraps around the motor pulley and the drive shaft pulley, and means for providing electricity to the motor. Preferably, the power driving means comprises means for varying the speed of rotation of the drive shaft.

The central post and the arms preferably have a generally square cross sectional shape. This shape minimizes the stress on the attachment and holding means due to rotation.

The central post and the arms also preferably comprise extensions to increase or decrease their lengths. This adjustment in length is useful to accommodate varying sizes, types, and speeds of animals.

To enhance the portability of the device, the upper arm unit preferably comprises an upper base which is attached to and positioned generally at the top end of the central post. The preferred upper base is a flat plate which is generally perpendicular to the longitudinal axis of the central post.

In the preferred embodiment, the upper arm unit further comprises one arm attachment unit for each arm. This arm attachment unit attaches to the base and to the arm. The preferred shape for each arm attachment unit is triangular. In an alternative embodiment, the top surface of the upper base has wheels and legs which are useful for moving and balancing the upper arm unit.

The device of the invention can accommodate a multiplicity of animals at once, while keeping the animals at a sufficient distance from one another to prevent conflicts. The device can also accommodate animals having different sizes, structures and conditioning needs.

The ability to separate the device into two main units and the ability of the device to adapt to various power sources enhance the portability of the device.

Accordingly, it is a primary object of the present invention to provide an improved device for conditioning, exercising and walking animals which is adjustable, lightweight, and portable.

A primary advantage of the device of the present invention is that the arms fold inward and downward to increase the portability of the device and to minimize the storage space necessary when the device is not in use.

Another advantage of the present invention is that the device can accommodate a varying number and size of animals at varying speeds.

Other objects and further scope of applicability of the present invention will become apparent from the detailed description to follow, taken in conjunction with the accompanying drawing.

BRIEF DESCRIPTION OF THE DRAWINGS

FIG. 2 of the drawing is a back isometric view of the preferred device of the present invention illustrating retracted arms in a lowered position and a cutaway view of the lower drive unit; and FIG. 3 of the drawing is an isometric view of the upper arm unit of the device of the invention in a folded or storage position.

DESCRIPTION OF THE PREFERRED EMBODIMENT

Figure 1:
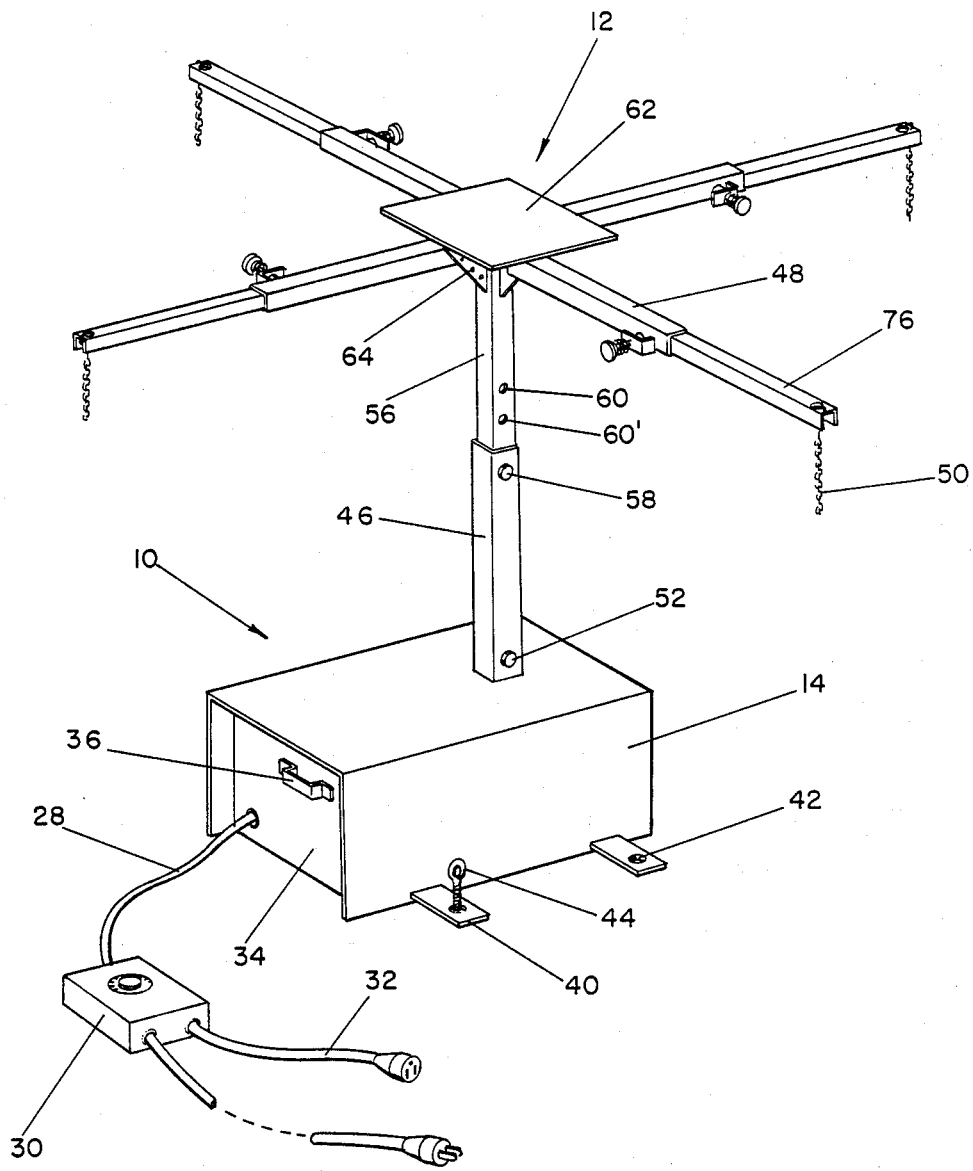
FIG. 1 of the drawing is a front isometric view of the preferred device of the present invention illustrating extended arms and an extended central post.

This invention relates to a device for conditioning, exercising and walking animals, in particular dogs and cats. The preferred device is adjustable to different size animals and varying speeds. The device is portable, lightweight and compact for ease in transport and storage.

The device of the invention comprises two separable units; a lower drive unit and an upper arm unit. The lower drive unit provides a stable base for the upper arm unit. The lower drive unit also houses the motor and provides means for allowing the upper arm unit to rotate. The upper arm unit of the device comprises a central post and arms which attach to and fold downward and inward towards the central post for storage or transportation purposes. These two units disassemble from each other so that the device can be easily transported and stored.

FIGS. 1 and 2 illustrate the device of the invention in different operating positions. The device comprises a lower drive unit 10 and an upper arm unit 12. The lower drive unit 10 comprises a housing 14 for enclosing the power driving means. The preferred power driving means, as shown in the cutaway of FIG. 2, comprises a motor 16, a gear box 18, a motor pulley 20, a drive shaft 22, a drive shaft pulley 24, and a drive belt 26. The drive belt 26 wraps around the motor pulley 20 and the drive shaft pulley 24 so that as the motor 16 and gear box 18 cause the motor pulley 20 to rotate, the drive belt 26, in turn, causes the drive shaft pulley 24 and drive shaft 22 to rotate. The pulleys 20 and 24 are held in position within the housing 14 by means, common to the art, such as bearings.

Preferably, a drive belt 26 is used instead of other possible driving means, such as a chain and sprocket system, so that the drive belt 26 will slip on the pulleys 20 and 24 if the upper arm unit 12 becomes obstructed or if an animal is unable to move. This slip clutch acts as a safety feature to prevent injury to the animal.

Preferably, the motor 16 is a variable speed motor so that the upper arm unit 12 can be rotated at varying speeds depending upon the type of animal, the size of the animal, and the purpose of the exercise (i.e. walking at a slow speed or gaiting at a faster speed).

The motor may be powered by an electric cord 28 as shown in FIG. 1, which is attached to a power source, such as a typical 110 volt electrical outlet or a car generator, or by a battery or other powering means, common to the art. FIG. 1 shows the electric cord 28 attached to a control box 30, with an extra cord 32 for attaching an additional exercising device. This embodiment is especially useful for professional dog handlers who need to exercise and condition many dogs every day and would thus require more than one device.

The controls may be in a hand held unit 30, such as shown in FIG. 1, or the controls may be clipped or mounted on the housing 14 (not shown). The preferred controls are for "on" and "off" positions and for varying the speed.

The housing 14 preferably comprises a door 34 for access to the power driving means. This door 34 may be on an end panel, as shown in FIGS. 1 and 2, or on a side panel (not shown), or on the top or bottom of the housing 14 (not shown).

The lower drive unit 10 preferably further comprises a handle 36 and wheels 38 for moving the lower drive unit 10 or the entire device. One merely needs to lift the lower drive unit 10 with the handle 36 and pull or push the lower drive unit 10 so that it rolls on the wheels 38. Preferably, the wheels 38 are recessed, as shown in FIG. 2, so that the lower drive unit 10 can sit flat on the ground and be stabilized during operation. A pulling strap (not shown) could also be used in accordance with the invention, with or without the handle 36.

Several means are available to stabilize the lower drive unit 10 of the invention and to keep it stationary during operation. FIGS. 1 and 2 show the use of extended legs 40 with an opening 42 for a bolt or stake 44.

This embodiment is useful when the lower drive unit 10 is positioned on grass or dirt. If the lower drive unit 10 is positioned on a more solid surface, such as asphalt or concrete, suction cups (not shown) placed on the bottom of the lower drive unit 10 are useful for holding the lower drive unit 10 in place. For a more permanent installation on a hard surface, an expansion anchor type bolt (not shown) may be placed through the openings 42 in the legs 40.

The upper arm unit 12 of the invention comprises a central post 46, at least one arm 48, and animal attachment means on each arm 48, such as a rope or chain 50. The drawing shows the preferred embodiment which has four arms 48 to maximize the number of animals which can be exercised at a time, while giving the animals plenty of space, and to provide stability for the device. Two arms, three arms, or more than four arms could also be utilized in accordance with the invention.

The drive shaft 22 of the lower drive unit 10 attaches to the central post 46 of the upper arm unit 12. Preferably, a drive shaft adaptor (not shown) is placed over the drive shaft 22 to extend the drive shaft 22 through the top of the housing 14. The drive shaft adaptor attaches to the central post 46 rather than the drive shaft 22. Throughout the specification and claims, the term "drive shaft" is meant to include such an adaptor. The rotation of the drive shaft 22 causes a rotation of the upper arm unit 12, thus providing a circular or rotational path for the animal(s). The drive shaft 22 and central post 46 are attached by attachment means, such as a pin or bolt 52 which passes through an opening 54 in the drive shaft 22 and central post 46. The attachment means utilized in accordance with the invention should make it easy for a user to attach and detach the central post 46 to and from the drive shaft 22 to enhance the portability of the device.

In the preferred embodiment, shown in the drawing, the central post 46 has an extension 56 for raising or lowering the vertical height of the arms 48. This embodiment is useful to adjust the device to varying heights of animals. Adjustment means, such as a bolt 58 which passes through an opening 60 in the central post 46 and the extension 56, keep the extension 56 in place after a particular vertical height has been selected. FIGS. 1 and 2 show multiple openings 60 and 60' which provide multiple vertical height settings. The extension 56 may fit within the central post 46, as shown in FIGS. 1 and 2, or the central post 46 may fit within the extension 56 as shown in FIG. 3.

The upper arm unit 12 comprises at least one arm 48, and preferably four arms, as shown in the drawing, which extend outward to a horizontal position and which fold inward and downward towards the central post 46 to a vertical position. Preferably, the device comprises intermediate holding means for holding the arm(s) 48 at an intermediate position between the horizontal and vertical positions. The extended horizontal position, illustrated in FIG. 1, is useful during operation for tall or large animals. Likewise, an intermediate position, illustrated in FIG. 2, is useful during operation for shorter or smaller animals. The vertical position, illustrated in FIG. 3, is useful for moving or storing the upper arm unit 12 or the entire device.

The preferred shape of the central post 46 and arms 48 is a square shape as shown in the drawing. With this shape, the central post 46 and arms 48 tend to receive the stress due to rotation rather than the attachment means.

In the preferred embodiment of the invention, shown in the drawing, the device comprises an upper base 62, and arm attachment units 64. These are best illustrated in FIG. 3. The plane of the base 62 is preferably perpendicular to the longitudinal axis of the central post 46 and attaches to the top of the central post 46. There is one arm attachment unit 64 for each arm 48. The arm attachment unit 64 attaches to the lower surface of the base 62. The arm 48 attaches to the arm attachment unit 64 by attachment means such as a pin 66 which passes through an opening in the arm 48 and the arm attachment unit 64. The arm attachment unit allows the arm to be moved from a horizontal position to a vertical position, and preferably to intermediate positions as well.

The arm attachment unit 64 preferably comprises holding means, such as a pin 68 and openings 70, 70', 70" and 70"', to hold the arm 48 in various positions. For example, referring to FIG. 3, when the arm 48 is in an extended horizontal position, the pin 68 would pass through opening 70. When the arm 48 is in a vertical position, such as in FIG. 3, the pin 68 passes through opening 70"'. In intermediate arm positions, the pin 68 would pass through the intermediate openings 70' and 70", depending upon the desired position. The number of openings depends upon the number of arm positions desired.

The preferred arm attachment unit shape 64 shown in the drawing is a triangular shape. This triangular shape decreases the weight of the upper arm unit 12 and causes minimal interference when the arm(s) 48 are raised and lowered. Those skilled in the art can appreciate that other shapes can be used for the arm attachment unit 64, in accordance with the invention.

An alternative embodiment of the invention, shown in FIGS. 2 and 3 of the drawing, comprises wheels 72 on the upper surface of the upper base 62 so that when the upper arm unit 12 is removed from the lower drive unit 10, the upper arm unit 10 can be inverted as shown in FIG. 3, and can be easily moved by merely pushing or pulling the upper arm unit 12 on its wheels 72. In this embodiment, it is preferable to have four wheels 72 on the upper base 62 (not shown) or at least two wheels 72 with at least two feet 74 so that the upper base 62 rests flat in a storage position. The two wheel 72 and two feet 74 embodiment shown in FIGS. 2 and 3 enables a person to use the arm(s) 48 and central post 46 as a "handle" to tilt the upper arm unit 12 as it is being moved, thus making it easier to move.

In the preferred embodiment of the invention, the device further comprises an extension 76 for each arm 48 to accommodate varying size animals and speeds. With the arm extended, animals are spaced further apart and conflicts between the animals are minimized. Preferably, the extension 76 can be adjusted inward or outward. In this embodiment, the animal attachment means 50 attaches to the extension 76 rather than directly to the arm 48.

To prepare the preferred device of the invention for operation, the lower drive unit 10 is preferably positioned on a level surface and stabilized by driving a bolt or stake 44 through the legs 40 or by utilizing suction cups positioned on the lower surface of the housing 14. The upper arm unit 12 is positioned on the lower drive unit 10 so that the drive shaft 22 and central post 46 are engaged. The arms 48 are positioned so that they extend either horizontally (see FIG. 1) or in an intermediate position (see FIG. 2), depending upon the type of animal to be accommodated and the speed desired. The central post extension 56 is adjusted to a desired vertical height and the arm extensions 76 are adjusted to a desired length, also depending upon the type of animal and speed.

During operation of the device of the invention, power is provided to the motor 16, and an animal or animals are secured or attached to the arm 48 or the arm extension 76 by the animal attachment means 50. The animal attachment means 50 should be sufficiently slack to provide comfort to the animal. In the preferred embodiment, a desired speed is selected. Rotation of the drive shaft 22 causes a circular rotation of the arms 48, thereby causing the animal(s) to walk in a circular path. If the animal completely stops or the arms 48 become obstructed, the preferred slip clutch arrangement prevents the device from pulling or choking the animal. As long as the animal moves, however, the upper arm unit 12 continues to rotate. The device is useful for walking the animal at a slow speed, for conditioning and exercising animals at a trotting speed, and for leash training animals.

To move or store the device of the invention, the arms 48 are folded downward and inward towards the central post 46 and the upper arm unit 12 is removed from the lower drive unit 10. The upper arm unit 12 may be inverted for storage and/or moving on its base 62.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A portable device for exercising animals of various heights, said device being assembleable and disassembleable by a user, without tools, said device comprising:
    a lower drive unit comprising a substantially flat base for supporting said device while in use, a rotatable driveshaft extending vertically therefrom, and power driving means for rotating said driveshaft;
    an upper arm unit comprising a central post, one end of which is attachable to and detachable from said driveshaft, without the use of tools, the other end of which comprises arm affixing means;
    at least one arm rotatably attached at its inner end to said arm affixing means, said arm being rotatable within a plane extending through said central post, between and setable at a fully down, collapsed position against said cental post and a fully up position, perpendicular to said central post, said arm being affixable at a plurality of selected angles, between said fully down and fully up positions, to said central post, without the use of tools, said angles being selectable in accordance with the height of the animal to be exercised; and
    means for affixing an animal to be exercised to the outer end of said arm.

2. The invention of claim 1 wherein said arm is adjustable in length without the use of tools to vary the radial distance of the animal being exercised to the central post and thereby to vary the pace of the animal in relation to the turning speed of the central post.

3. A portable device for exercising animals of various heights, said device being assembleable and disassembleable by a user, without tools, said device comprising:
    a lower drive unit comprising a substantially flat base for supporting said device while in use, a rotatable driveshaft extending vertically therefrom, and power driving means for rotating said driveshaft;
    an upper arm unit comprising a central post, one end of which is attachable to and detachable from said driveshaft, without the use of tools, and the other end of which comprises arm affixing means;
    a plurality of arms rotatably attached at their inner ends to said arm affixing means, each of said arms being individually and independently rotatable within its own plane extending through said central post between and setable at a fully down, collapsed position against said central post and a fully up position, perpendicular to said central post, each said arm being individually and independently affixable at a plurality of selected angles between said fully down and fully up positions to said central post without the use of tools, said angles being selectable in accordance with the height of the animal to be exercised; and
    means for affixing an animal to be exercised to the outer end of each of said arms.

4. The invention of claim 3 wherein each of said arms is adjustable in length without the use of tools to vary the radial distance of the animal being exercised thereon to the central post and thereby to vary the pace of the animal in relation to the turning speed of the central post.

5. The device of claim 3 wherein said lower drive unit further comprises a housing for enclosing said power driving means.

6. The device of claim 5 wherein said lower drive unit further comprises stabilizing means for preventing said device from moving or falling over during operation.

7. The device of claim 6 wherein said stabilizing means comprising legs which extend outward from said base.

8. The device of claim 6 wherein said stabilizing means comprises suction cups positioned on said base.

9. The device of claim 5 wherein said lower drive unit further comprises wheels attached to said housing for moving said lower drive unit by itself and said device when said lower drive unit and said upper arm unit are attached thereto.

10. The device of claim 9 wherein said wheels are recessed into the housing so that said base can be seated flat against an operating surface.

11. The device of claim 5 wherein said lower drive unit further comprises a handle attached to said housing for moving said lower drive unit by itself and said device when said lower drive unit and said upper arm unit are attached thereto.

12. The device of claim 3 wherein said power driving means comprises an electrical motor, a motor pulley, a drive shaft pulley which attaches to said drive shaft, a drive belt which wraps around said motor pulley and said drive shaft pulley, and means for providing electricity to said motor.

13. The device of claim 3 wherein said power driving means comprises means for varying the rotational speed of said drive shaft.

14. The device of claim 3 wherein said central post and said arms have generally square cross sections.

15. The device of claim 3 wherein said central post comprises an extendable portion and means for holding said extended portion in at least two positions to provide at least two heights for said central post.

16. The device of claim 3 wherein said upper arm unit further comprises an upper base attached to and positioned essentially at the top of said central post.

17. The device of claim 16 wherein said upper base comprises a generally flat plate attached to and positioned substantially perpendicular to the longitudinal axis of said central post.

18. The device of claim 17 wherein said upper arm unit further comprises an arm attachment unit connecting said base to each of said arms.

19. The device of claim 18 wherein said arm attachment unit comprises a generally flat triangular plate.

20. The device of claim 17 wherein said upper base further comprises at least two wheels attached to and positioned on the top surface thereof.

21. The device of claim 20 wherein said upper base further comprises legs for balancing said upper base when said upper arm unit is inverted and said upper base is placed on a flat surface.

* * * * *